April 26, 1927.
W. C. GEER
1,626,459
GOLF BALL AND METHOD OF MAKING THE SAME
Filed March 5, 1924
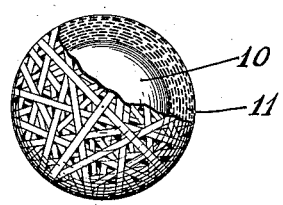
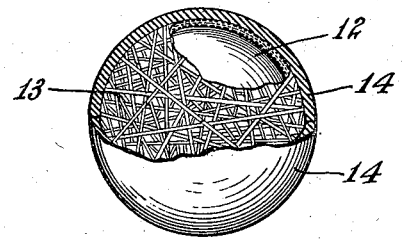
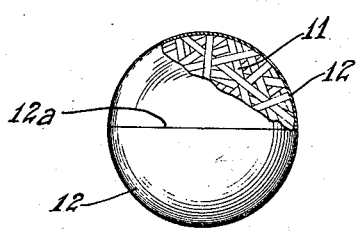
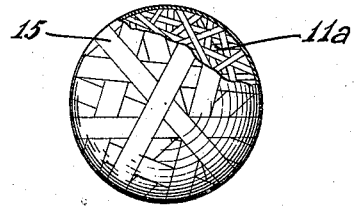
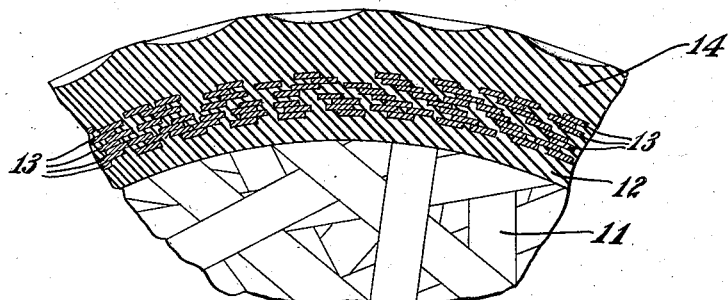
Inventor
William C. Geer
By Robert M. Pierson
Atty.

Patented Apr. 26, 1927.

1,626,459

UNITED STATES PATENT OFFICE.

WILLIAM C. GEER, OF AKRON, OHIO, ASSIGNOR TO THE B. F. GOODRICH COMPANY, OF NEW YORK, N. Y., A CORPORATION OF NEW YORK.

GOLF BALL AND METHOD OF MAKING THE SAME.

Application filed March 5, 1924. Serial No. 696,997.

This invention relates to the construction of golf balls, more particularly to golf balls embodying the usual core surrounded by tense rubber windings, and having a tough outer cover of gutta-percha, balata or the like which fills the interstices of the outer wraps of said windings.

The chief objects of my invention are to produce a golf ball having improved union of the cover material with the wound structure, and to provide a simple and effective method for making the same, whereby I obtain a superior ball capable of longer flight and having increased durability. A further object is to provide a golf ball having a tough outer layer of covering material adapted to withstand rough usage and, coalesced therewith, an inner, softer layer of covering material adapted to be thoroughly compacted into the interstices of a winding or windings of rubber thread or tape constituting a part or parts of the ball.

In the manufacture of golf balls it is common practice to apply a cover of balata or the like, in the form of hemi-spherical shells, to the wound center, enclose the same without pressure in a hot mold until the cover shells are softened, and then forcibly close the mold and thereby force the plastic cover material into the interstices of the outer windings of the center, the later preferably comprising several wrapped layers of a narrower strand of rubber than that used in the inner regions of the winding, so as to provide a better anchorage for the cover. This method is open to the objection that considerable time and great mold pressure is required to force the plastic cover material into the interstices of the outer, narrow-thread windings, and unless this is done the force of a blow upon the ball will not be properly transmitted directly to the liquid-filled core. These objections are overcome by my present invention, wherein the thread windings of the ball are completely imbedded within the cover material.

Of the accompanying drawings:

Fig. 1 is a view in section and elevation of a golf ball "center" of a known type, consisting of a liquid-filled core and a plurality of layers of tense rubber windings thereon.

Fig. 2 is an elevation, with a part sectioned and broken away, of the center shown in Fig. 1 and a relatively thin inner cover layer of gutta-percha or balata enveloping the same in accordance with the preferred form of my invention.

Fig. 3 is an elevation, with a part sectioned and broken away, of the complete ball prior to molding, consisting of the structure of Fig. 2, several layers of thread rubber wrapped thereon, and an outer cover of the same material as the inner cover layer.

Fig. 4 is a fragmentary view, on a large scale, of the finished ball, after vulcanization, the center being shown in elevation and the outer structure thereon in section.

Fig. 5 is a view of a partially constructed ball representing a modification, a part being sectioned and broken away.

Referring to the drawings, which show the preferred method of making my improved ball, 10 is a core, which may be of any suitable material and construction, but is preferably liquid-filled, and 11 is the usual tense winding of relatively wide rubber tape, which may be applied with the usual winding apparatus, 12, 12 are thin, hemi-spherical shells of the usual covering material, such as a gutta-percha or balata composition or the like, but preferably somewhat softer than that which is used for the outer cover layer of the finished ball, so as the more readily to be forced into the interstices of the rubber winding, said shells being formed and applied to the wound center in any suitable manner and joined in a butt seam 12ª.

After the shells 12 are applied, the ball is wound with several layers of relatively narrow rubber tape or thread 13, which tightly grips the thin inner cover shells 12 and leaves numerous interstices open to the surface. The next step is to apply the outer layer of covering material, which may be very tough, since the softer inner cover layer 12, 12 is adapted to be forced out through the interstices of the thread winding 13 to meet it. Said outer layer preferably is applied as a pair of previously-formed, hemispherical sections or shells 14, 14. The latter preferably are formed of less than the usual thickness to compensate for the thickness of the inner shells 12, 12, although this effect may be had by reducing the thickness of the windings 11. The ball is then placed in a mold without pressure, heated until the cover material becomes plastic, and molding pressure then applied in the usual manner. During the heating of the ball in the mold the inner shells 12 as well as the outer covers 14 become softened, and particularly the former, so that when molding pressure is applied the material of said inner shells is forced outward into the interstices of the thread windings 13, meeting the material of the outer cover shells 14 as the latter is forced inward through said windings.

The outer winding of narrow thread 13 is thus completely imbedded in the cover material, effectively anchoring the cover to the center and providing a ball of improved characteristics as to flight and durability. Moreover, the time and pressure required for forcing cover material into the thread windings from opposite sides is considerably less than is required for forcing it from one side only, particularly in the case of tough covering material requiring a high degree of heat and pressure to cause it to flow freely, and this results in a saving of time in manufacture, and in less distortion or displacement of the thread windings.

In the modification shown in Fig. 5, an inner cover is applied to the windings 11 in the form of a tape 15 of cover material, said tape being wound upon the rubber winding 11a. The ball may then be completed as above described with reference to the preferred embodiment.

My invention may be further modified within its scope and I do not limit my claims wholly to the specific construction shown nor to the exact procedure described.

I claim:

1. A golf ball comprising a core, a tense rubber winding thereon, an inner cover layer of dense material upon said winding, a winding of strand material upon said layer, and a tough outer cover completely enclosing the ball, said outer cover being united with said inner cover layer through the interstices of the intervening winding of strand material.

2. A golf ball comprising a core, a tense rubber winding thereon, a tough, molded cover, and a winding of rubber thread completely imbedded in said cover.

3. A golf ball comprising a wrapped center, a tough molded cover on said center, and a plurality of wraps of thread completely imbedded within said cover and remote from the outer surface thereof.

4. The method of making a golf ball which comprises enclosing a wrapped center in a layer of cover material, so winding a thread thereon as to provide interstices between the adjacent turns of the winding, enclosing the structure thus formed in a tough outer layer of cover material, and by heat and pressure uniting the two layers of cover material through the interstices of the intervening thread winding.

5. The method of making a golf ball which comprises enclosing a wrapped center within pre-formed, hemi-spherical shells of cover material, so winding rubber thread thereon as to provide interstices between the adjacent turns of the winding, enclosing the resulting structure within a tough outer cover, and then subjecting the same to heat and molding pressure whereby the cover layers are softened and forced through the interstices of the intervening thread winding to completely imbed the latter.

6. The method of making a golf ball which comprises enclosing a wrapped center within relatively thin, hemi-spherical shells of cover material, so winding a plurality of layers of strand material thereon under tension as to provide interstices between the adjacent turns of the winding, enclosing the article within relatively thick hemi-spherical shells of cover material, and then subjecting it to heat and molding pressure whereby the respective cover layers are softened and forced through the interstices of said winding so that they unite therein.

7. A golf ball comprising a core, a tense rubber winding thereon, a tough, molded, outer cover and a softer inner cover on said winding and a winding of rubber thread completely imbedded in said inner cover.

In witness whereof I have hereunto set my hand this 29th day of February, 1924.

WILLIAM C. GEER.